United States Patent
Blatz (10) Patent No.: US 9,697,659 B2
(45) Date of Patent: Jul. 4, 2017

(54) SIGN DETECTION IN MULTI-DIMENSIONAL SIGNAL MEASUREMENTS

(71) Applicant: Atmel Corporation, San Jose, CA (US)

(72) Inventor: Werner Blatz, Leingarten (DE)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 15/167,790

(22) Filed: May 27, 2016

(65) Prior Publication Data

US 2016/0275734 A1 Sep. 22, 2016

Related U.S. Application Data (63) Continuation of application No. 14/560,713, filed on Dec. 4, 2014, now Pat. No. 9,355,509.

(60) Provisional application No. 62/084,517, filed on Nov. 25, 2014.

(51) Int. Cl.
G07C 9/00 (2006.01)
G06K 7/10 (2006.01)
H04B 7/00 (2006.01)

(52) U.S. Cl.
CPC ...... G07C 9/00111 (2013.01); G06K 7/10257 (2013.01); G07C 9/00007 (2013.01); H04B 7/00 (2013.01); G07C 2009/00555 (2013.01)

(58) Field of Classification Search
CPC ...... G07C 9/00111; G07C 2009/00317; G07C 2009/00325; G07C 2009/00333; G07C 2009/00349; G07C 2009/00357; G07C 2009/00365; G07C 2009/0038; G07C 9/00; G01S 13/02; G01S 13/74
USPC ................................................ 340/5.61–5.65
See application file for complete search history.

(56) References Cited

U.S. PATENT DOCUMENTS

| | | | |
|---|---|---|---|
| 3,106,710 A | 10/1963 | Stover | |
| 3,156,907 A | 11/1964 | Stover | |
| 3,407,397 A | 10/1968 | Snare | |
| 3,510,769 A | 5/1970 | Landee | |
| 9,262,033 B2 * | 2/2016 | Idzik | G06F 3/046 |
| 2014/0207407 A1 * | 7/2014 | Liang | G01B 7/003 |
| | | | 702/150 |

* cited by examiner

*Primary Examiner* — Allen T Cao
(74) *Attorney, Agent, or Firm* — Fish & Richardson P.C.

(57) ABSTRACT

Systems, methods, circuits and computer-readable mediums are disclosed for sign detection in multi-dimensional signal measurements. In some implementations, orthogonally oriented antennas are configured to generate signals in response to a magnetic field, where the signals correspond to components of magnetic field vectors in space. A circuit is coupled to the antennas and configured to: determine polarities of the signals based on phase measurements between the signals; reduce a possible number of magnetic field vector interpretations based on the determined polarities of the signals; reduce a possible number of angles or angle differences between the magnetic field vectors based on the reduced possible number of magnetic field vector interpretations; compare the reduced possible number of angles or angle differences to predetermined angle or angle differences; and detect a relay attack based on results of the comparing.

20 Claims, 5 Drawing Sheets

SIGN DETECTION IN MULTI-DIMENSIONAL SIGNAL MEASUREMENTS

CLAIM OF PRIORITY

This application is a continuation of and claims priority to U.S. patent application Ser. No. 14/560,713, filed Dec. 4, 2014, which claims priority to U.S. Provisional Application Ser. No. 62/084,517, filed on Nov. 25, 2014, the entire contents of each of which are hereby incorporated by reference.

TECHNICAL FIELD

This disclosure relates generally to multi-dimensional signal measurements.

BACKGROUND

Contactless data communication has been employed in multiple industries, including the automotive industry. There, contactless data communication is used to gain access to a vehicle. A key or key fob is held by a person and is operable to communicate with a vehicle when the key fob is within range of wireless communication with the vehicle. The person may press a button on the vehicle or lift the handle of a door of the vehicle to initiate communication between the vehicle and the key or key fob. Once communication is initiated, the vehicle and the key or key fob may exchange messages to allow the person access to the vehicle. For example, the key or key fob may transmit one or more authentication messages that the vehicle validates.

One problem that has arisen with contactless data communication is that it is susceptible to a relay attack. In the context of access to vehicles, this attack includes a person initiating the communication with the vehicle by pushing a button on the vehicle or lifting a handle on the vehicle's door. The vehicle then transmits a signal, which is captured by the person and relayed to a remote device using a transceiver. The remote device may be located away from the vehicle but in proximity to the key or key fob. For example, the vehicle may be in a parking lot of a restaurant and the owner of the vehicle may be in the restaurant. The remote device may be located inside the restaurant and may relay the signal transmitted by the vehicle in the restaurant. The key fob, while in the possession of the owner, may receive the signal transmitted by the vehicle as a result of the remote device and may respond with authentication signals. The remote device may capture the authentication signals and transmit them to the person in proximity with the vehicle who initiated the communication. The transceiver held by the person may transmit the authentication signals to the vehicle and the vehicle may validate the authentication signals. This may allow an unauthorized person access to the vehicle.

SUMMARY

Systems, methods, circuits and computer-readable mediums are disclosed for sign detection in multi-dimensional signal measurements.

In some implementations, a system includes orthogonally oriented antennas that are configured to generate signals in response to a magnetic field, where the signals correspond to components of magnetic field vectors in space. A circuit is coupled to the antennas and configured to: determine polarities of the signals based on phase measurements between the signals; reduce a possible number of magnetic field vector interpretations based on the determined polarities of the signals; reduce a possible number of angles or angle differences between the magnetic field vectors based on the reduced possible number of magnetic field vector interpretations; compare the reduced possible number of angles or angle differences to predetermined angle or angle differences; and detect a relay attack based on results of the comparing.

In some implementations, a method comprises: generating, by orthogonally oriented antennas of a system, signals in response to a magnetic field, where the signals correspond to components of magnetic field vectors in space; determining, by a circuit of the system, polarities of the signals based on phase measurements between the signals; reducing, by the circuit, a possible number of magnetic field vector interpretations based on the determined polarities of the signals; reducing, by the circuit, a possible number of angles or angle differences between the magnetic field vectors based on the reduced possible number of magnetic field vector interpretations; comparing, by the circuit, the reduced possible number of angles or angle differences to predetermined angle or angle differences; and detecting, by the circuit, a relay attack based on results of the comparing.

In some implementations, a non-transitory, computer-readable storage medium includes instructions, which when executed by one or more processors, causes the one or more processors to perform operations comprising: generating, by orthogonally oriented antennas of a system, signals in response to a magnetic field, where the signals correspond to components of magnetic field vectors in space; determining, by a circuit of the system, polarities of the signals based on phase measurements between the signals; reducing, by the circuit, a possible number of magnetic field vector interpretations based on the determined polarities of the signals; reducing a possible number of angles or angle differences between the magnetic field vectors based on the reduced possible number of magnetic vector interpretations; comparing the reduced possible number of angles or angle differences to predetermined angles or angle differences; and detecting a relay attack based on results of the comparing.

DETAILED DESCRIPTION

One type of contactless data communication for vehicles is the passive entry, passive start (PEPS) system. The PEPS system uses several low frequency (LF) antennas within a vehicle that are operated sequentially together with a key or key fob incorporating a three-dimensional (3D) magnetic antenna to detect a transmitted magnetic field from the LF vehicle antennas. The key or key fob includes an LF receiver that provides three communication channels to receive the 3 orientations (x, y, z) of a magnetic field transmitted by the LF vehicle antennas. The three communication channels provide voltages that can be measured and used to calculate a received signal strength indicator (RSSI).

The measured channel voltages (x, y, z) represent a vector per each transmitting vehicle antenna having an amplitude and an orientation within a 3D space, where the amplitude is given by $$\text{Amplitude} = \sqrt{x^2 + y^2 + z^2}. \quad [1]$$

To avoid the relay attack scenario described above, the angles between the vectors can be calculated. Indeed, an embodiment provides that angles between vectors can be used for defending against relay attacks for two antennas that are operated sequentially or at the same time. When two vehicle antennas are operated sequentially, two individual triples (x, y, z) of voltages can be measured sequentially from the LF receiver channels, representing the two vectors generated by the two car antennas.

As an example, assume that two vectors $\vec{a}$ and $\vec{b}$ are measured, having components (1, 4, −2) and (−3, 3, 1), respectively. The amplitudes of these vectors can be calculated:

$$\text{Amplitude}_a = \sqrt{1^2 + 4^2 + -2^2} = 4.58$$

$$\text{Amplitude}_b = \sqrt{-3^2 + 3^2 + -1^2} = 4.36$$

The angle between the two vectors can be calculated by the following formula:

$$\theta = \cos^{-1} \frac{\vec{a} \cdot \vec{b}}{|\vec{a}||\vec{b}|} = 69.49°. \quad [2]$$

As can be seen in this example, the individual vector components (x, y, z) can have different polarities according to the orientation and the position of the receiving 3D antenna (e.g., key or key fob) and the transmitting vehicle antenna. Receivers that are in the market today do not measure the polarity of the channel voltages. For example, there can be eight possible interpretations of the measured vector components (x, y, z). In the above example, vector $\vec{a}$ could be interpreted as: (1, 4, 2), (1, 4, −2), (1, −4, 2), (1, −4, −2), (−1, 4, 2), (−1, 4, −2), (−1, −4, 2) and (−1, −4, −2). The eight interpretations of vector $\vec{b}$ could be interpreted as: (3, 3, 1), (3, 3, −1), (3, −3, 1), (3, −3, −1), (−3, 3, 1), (−3, 3, −1), (−3, −3, 1) and (−3, −3, −1). The resulting vector amplitudes are not affected by the multiple interpretations by the term $\vec{a} \cdot \vec{b}$. The resulting calculations will result in 8*8=64 different interpretations where some of these are equal. For the vectors $\vec{a}$ and $\vec{b}$ in the above example, $\vec{a} \cdot \vec{b}$ results in the following 64 values:

| 7 | 11 | −17 | −13 | 13 | 17 | −11 | −7 |
|---|---|---|---|---|---|---|---|
| 11 | 7 | −13 | −17 | 17 | 13 | −7 | −11 |
| −17 | −13 | 7 | 11 | −11 | −7 | 13 | 17 |
| −13 | −17 | 11 | 7 | −7 | −11 | 17 | 13 |
| 13 | 17 | −11 | −7 | 7 | 11 | −17 | −13 |
| 17 | 13 | −7 | −11 | 11 | 7 | −13 | −17 |
| −11 | −7 | 13 | 17 | −17 | −13 | 7 | 11 |
| −7 | −11 | 17 | 13 | −13 | −17 | 11 | 7 |

Due to the chosen example, many of the samples are equal, but even in this case eight different values are possible: (7, −7, 11, −11, 13, −13, 17, −17). This results in 64 calculated angles.

| 69.5 | 56.6 | 148.3 | 130.6 | 49.4 | 31.7 | 123.4 | 110.5 |
|---|---|---|---|---|---|---|---|
| 56.6 | 69.5 | 130.6 | 148.3 | 31.7 | 49.4 | 110.5 | 123.4 |
| 148.3 | 130.6 | 69.5 | 56.6 | 123.4 | 110.5 | 49.4 | 31.7 |
| 130.6 | 148.3 | 56.6 | 69.5 | 110.5 | 123.4 | 31.7 | 49.4 |
| 49.4 | 31.7 | 123.4 | 110.5 | 69.5 | 56.6 | 148.3 | 130.6 |
| 31.7 | 49.4 | 110.5 | 123.4 | 56.6 | 69.5 | 130.6 | 148.3 |
| 123.4 | 110.5 | 49.4 | 31.7 | 148.3 | 130.6 | 69.5 | 56.6 |
| 110.5 | 123.4 | 31.7 | 49.4 | 130.6 | 148.3 | 56.6 | 69.5 |

Out of the 64 angles possible angles there are eight different angles: (69.5, 56.6, 148.3, 130.6, 49.4, 31.7, 123.4, 110.5). Due to the variety of angle interpretations and taking some measurement tolerances into account it is not reliably possible to use the calculated angle for relay attack purposes. As can be observed by the above example, it is desirable to greatly reduce the number of possible angle interpretations. As described in detail below, the number of possible angle interpretations can be reduced by measuring the polarity of the individual vector components (x, y, z).

Figure 1:
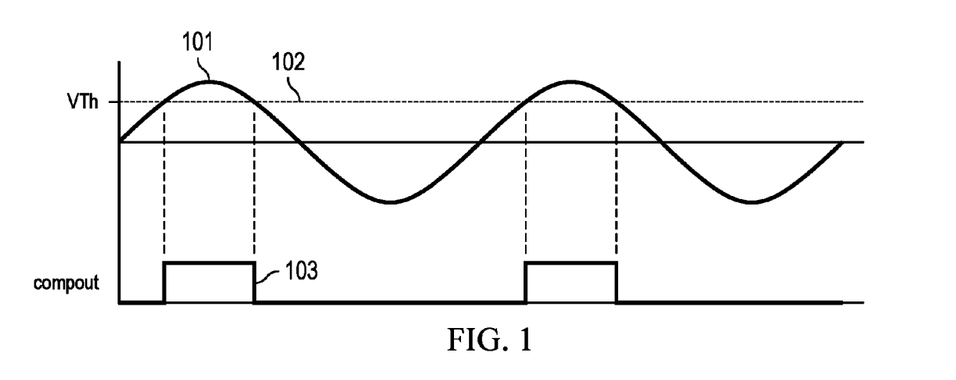
FIG. 1 illustrates comparing channel input signals to determine phase relationships between the channel input signals.

FIG. 1 illustrates comparing channel input signals to determine phase relationships between the channel input signals. In some implementations, a comparator function (implemented in software or hardware) can be used to detect if the x, y, z channel voltage values (sine waves) are above certain threshold values.

Referring to FIG. 1, a diagram 100 is shown with three signals. Signal 101 shows the input signal of an individual channel (x, y, z). Signal 102 represents the threshold signal of the comparator. Signal 103 represents the output of the comparator.

To detect the polarity between two individual channels (x, y or x, z or y, z), the comparator output signals (comp_out) of two individual channels are combined by an AND function. If comp_out_x AND comp_out_y is TRUE at any time, y is in phase with x. If comp_out_x AND comp_out_z is TRUE at any time, z is in phase with x. If comp_out_y AND comp_out_z is TRUE at any time, z is in phase with y.

Figure 2A:
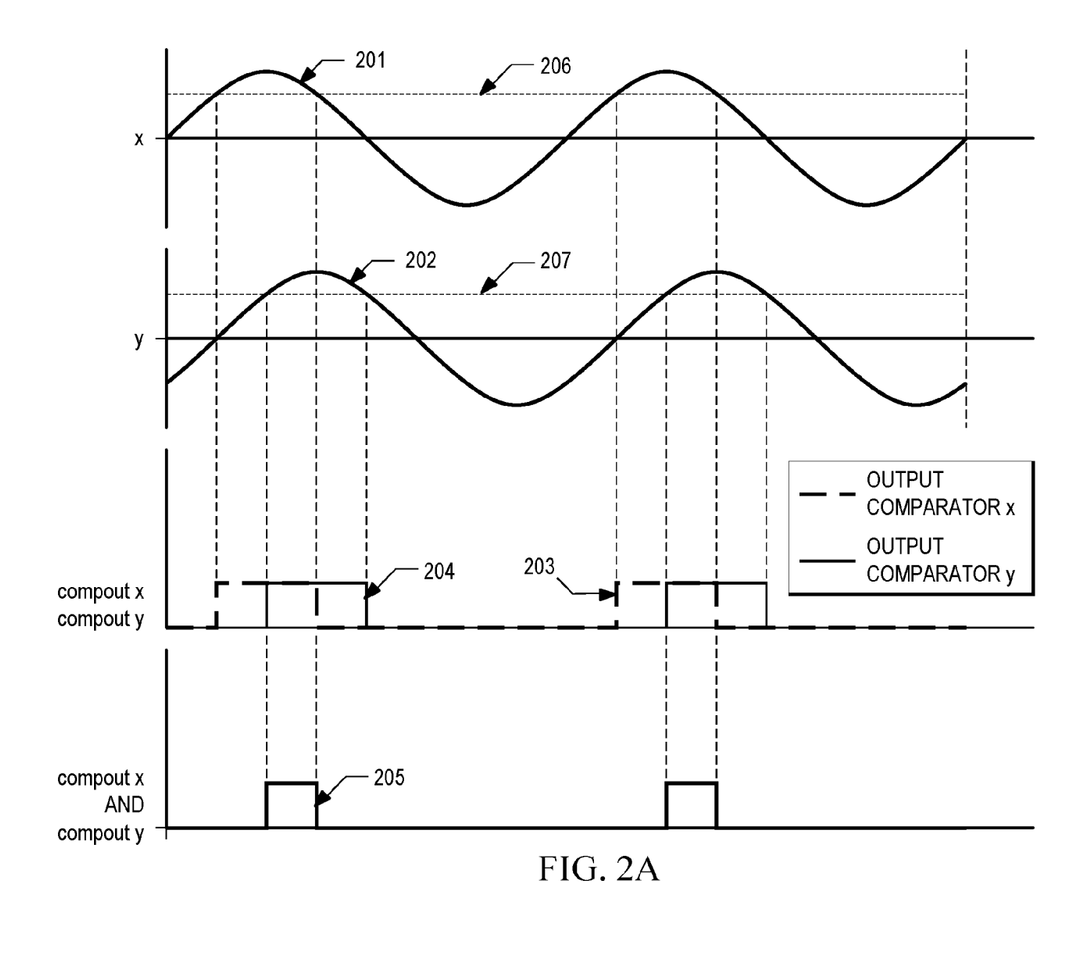
FIGS. 2A and 2B illustrate an example in-phase relationship between comparator output signals for x and y channels and an example out-of-phase relationship between comparator output signals for x and z channels, respectively.
Figure 2B:
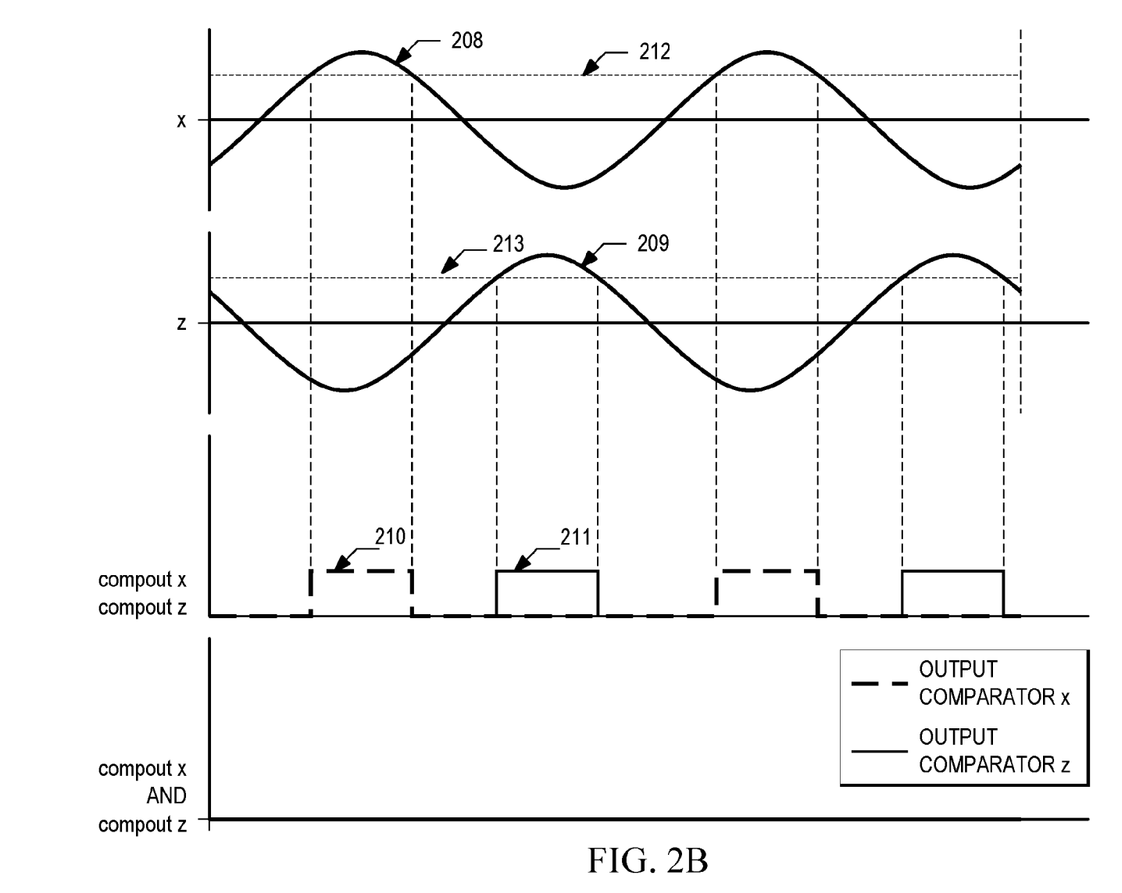

FIGS. 2A and 2B illustrate an example in-phase relationship between comparator output signals for x and y channels and an example out-of-phase relationship between comparator output signals for x and z channels, respectively.

FIG. 2A shows the input voltage signals on the x and y channels, the comparator output signals for the x and y channels and the output of an AND function applied to the comparator output signals. When input signals 201, 202 of the x and y channels exceed their respective comparator threshold values 206, 207, comparator output signals 203, 204 are generated and applied as inputs to an AND function (e.g., an AND gate). In this example, comparator output signals 203, 204 are high at the same time and the AND function generates output 205, which indicates an in-phase relationship between the x and y channels.

FIG. 2B shows the input voltage signals on the x and z channels, the comparator output signals for the x and z channels and the output of an AND function applied to the comparator output signals for the x and z channels. When input signals 208, 209 of the x and z channels exceed their respective comparator threshold values 212, 213, comparator output signals 210, 211 are generated and applied as inputs to an AND function (e.g., an AND gate). In this example, comparator output signals 210, 211 are not high at the same time and the AND function does not generate an output, which indicates an out-of-phase relationship between the x and z channels.

It can be observed from the examples shown in FIGS. 2A and 2B that there is usually some phase tolerance for in-phase channels (FIG. 2A) and opposite polarity channels (FIG. 2B), which will influence the selection of the comparator threshold value. To ensure that in-phase channels are detected securely, the comparator value should be low. To prevent that channels with opposite polarity are falsely recognized as "in phase" the comparator value should be high. In some implementations, an optimum compromise is to set the comparator threshold value where it is exceeded by 50% of the time during the positive half wave (90°). Thus, the comparator threshold value can be set to $$\frac{V_{peak}}{\sqrt{2}}$$

or 70.7% of the peak voltage value of the channel. If the comparator threshold value is set exactly to 70.7% of the peak value, the maximum allowed channel phase shift would be 90° to be recognized as being in phase. Tolerances of the implementation (e.g., comparator thresholds) and the RSSI measurement values (e.g., measured x, y, z components in the receiving antenna) are not considered here for explanation of the principal.

In some implementations, the polarity information can be used to improve the evaluation of the measured vector components (x, y, z) that are measured from several antennas (Ax, Ay, Az). For example, angle and/or angle difference determination between vectors resulting from different vehicle transmit antennas can be calculated. In some implementations, ratios between the same vector component measurements from different vehicle transmit antennas can be determined, such as Vx/A1/VxA2, VyA1/VyA2, VzA1/Vz2, where A1, A2 are two different vehicle transmit antennas. In some implementations, ratios between different vector component measurements from different vehicle transmit antennas can be determined, such as VxAn/VyAn, VxAn/VzAn, VyAn/VzAn. The ratios can be extended to any number of vehicle transmit antennas.

Figure 3:
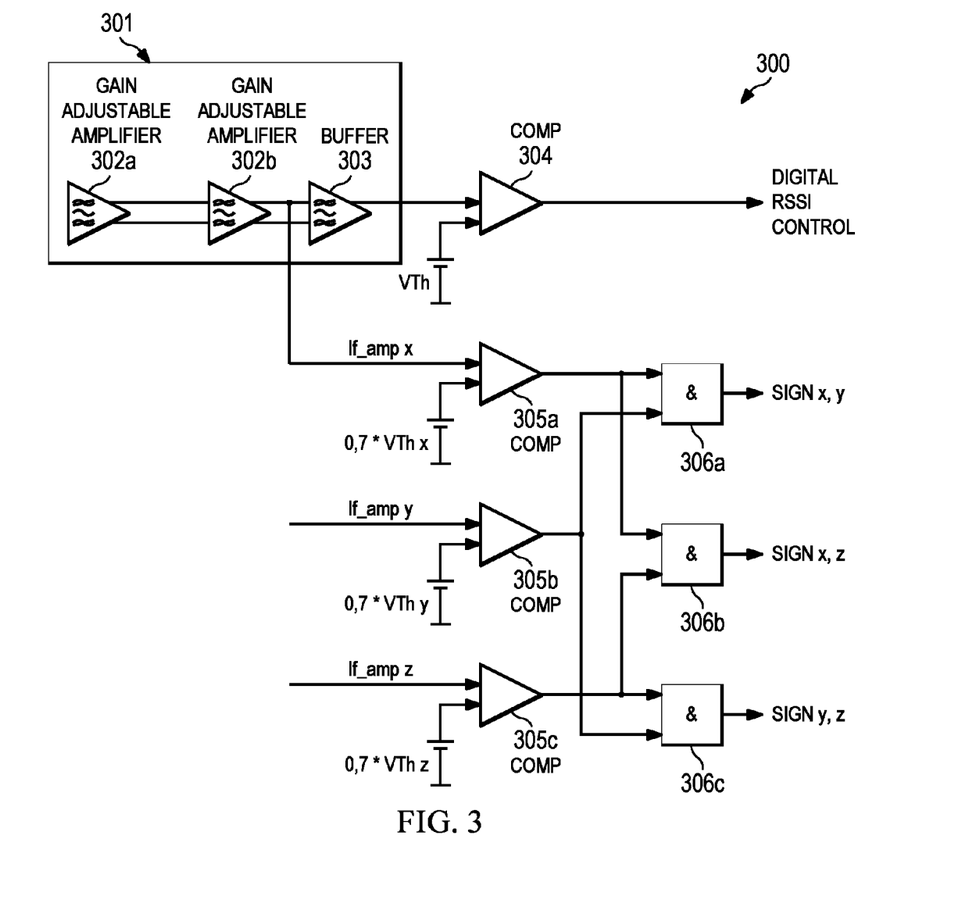
FIG. 3 illustrates a hardware system including comparators for detecting phase (sign) information between two channels according to some embodiments.

FIG. 3 illustrates a hardware system 300 including comparators for detecting phase (sign) information between two channels according to some embodiments. In some implementations, system 300 can include amplifier chain 301, digital RSSI control comparator 304, channel comparators 305a-305c and logic gates 306a-306c. Amplifier chain 101 further includes adjustable gain amplifiers 302a, 302b and buffer 303. In the example shown, the x channel is coupled to an output of adjustable gain amplifier 302b. The output of buffer 303 is coupled to an input of digital RSSI control comparator 304, where it is compared to a comparator threshold value Vth to generate a digital RSSI control signal. The RSSI control signal is processed in a way to control the amplifier chain 301 to set the peak value of the if_amp_x signal to Vth. The RSSI control mechanism is shown here only for channel x, but it is implemented also for channel y and channel z. Although not shown in this example, the y and z channels are also coupled to amplifiers in amplifier chain 301.

In this example implementation, the amplifier output signals are compared at 70.7% of their peak voltage by channel comparators 305a-305c while the peak value of all channels is equal due to the RSSI control mechanism. The comparator output signals of the individual channels have a duty cycle of 25% (90° of 360°) and are compared to each other by logic gates 306a-306c, which in this example are implemented as AND functions (e.g., AND gates) as follows:

x is compared to y>output signal-->sign x, y;

x is compared to z>output signal-->sign x, z; and y is compared to z>output signal-->sign y, z.

Outputs are generated by AND gates 306a-306c when two comparator output signals are present at the same time, thereby indicating that the two channels being compared are in-phase. If two channels are in-phase they have the same polarity, being out-of-phase indicates that they have opposite polarity.

Returning to the previous example described in reference to FIGS. 1, 2A and 2B, the 8 possible vector $\vec{a}$ interpretations without sign detection are: (1, 4, 2), (1, 4, −2), (1, −4, −2), (−1, 4, −2), (−1, 4, 2), (−1, 4, −2), (−1, −4, 2) and (−1, −4, −2). Using the sign detection process implemented by system 300 and noting that channels x and y (FIG. 2A) are in-phase and channels x and z are not in-phase (FIG. 2B), the 8 possible vector $\vec{a}$ interpretations are reduced to two vector $\vec{a}$ interpretations: (1, 4, −2) and (−1, −4, 2). This example reduction in vector interpretations was accomplished by detecting via the sign detection mechanism that channel x has the same polarity as channel y and channel z has opposite polarity in respect to channel x. The only vector interpretations in the example set of 8 vector interpretations that meet this reduction criterion are: (1, 4, −2) and (−1, −4, 2).

Likewise, the possible vector $\vec{b}$ interpretations without sign detection are: (3, 3, 1), (3, 3, −1), (3, −3, 1), (3, −3, −1), (−3, 3, 1), (−3, 3, −1), (−3, −3, 1) and (−3, −3, −1). Using the sign detection process implemented by system 300, the 8 possible vector $\vec{b}$ interpretations are reduced to two vector $\vec{b}$ interpretations: (−3, 3, 1) and (3, −3, −1). With sign detection implemented, $\vec{a} \cdot \vec{b}$ results in 2*2=4 possible vector interpretations, which in this example are [7, −7, −7, 7]. The angle calculation of Equation [2] results in [69.5, 110.5, 110.5, 69.5], which means that only two different angles [69.6, 110.5] need to be evaluated for relay attack prevention in a PEPS system.

Figure 4:
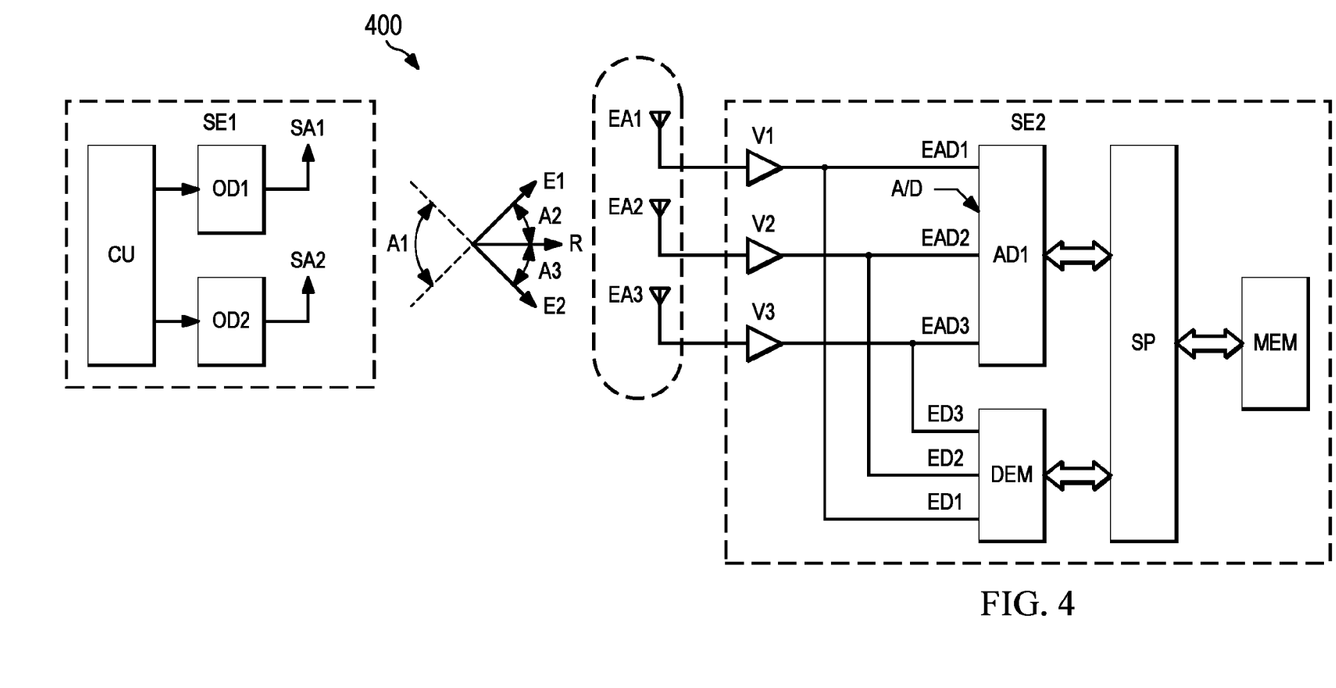
FIG. 4 is a conceptual block diagram illustrating components used in a system for secure contactless data communication that implements sign detection in multi-dimensional signal measurements according to some embodiments.

FIG. 4 is a conceptual block diagram illustrating components used in a system 400 for secure contactless data communication that implements sign detection in multi-dimensional signal measurements, as described in reference to FIGS. 1-3. In some embodiments, system 400 includes transceiver SE1 and transceiver SE2. In some embodiments, a data exchange or communication may occur by transmitting a data carrying modulated electromagnetic field between the transceiver SE1 and transceiver SE2. The transceiver SE1 comprises a control unit CU. The control unit CU is coupled to a first output driver OD1 and to a second output driver OD2. A first transmitting antenna SA1 is coupled to the first output driver OD1 and a second transmitting antenna SA2 is coupled to the second output driver OD2. In some implementations, SE2 can be included in, for example, a key or key fob used with PEPS system and SE1 can be included in a vehicle, where SA1 and SA2 are vehicle antennas.

In some embodiments, transceiver SE2 comprises three antennas EA1, EA2 and EA3 that are oriented orthogonally relative to each other. Receiving antennas EA1, EA2 and EA3 are coupled to signal amplifiers V1, V2 and V3, respectively. Signal amplifiers V1, V2 and V3 are coupled to inputs EAD1, EAD2 and EAD3 of an analog-to-digital (A/D) converter AD1, respectively. Furthermore, each input EAD1, EAD2 and EAD3 of the A/D converter AD1 is coupled with input ED1, ED2 and ED3 of a demodulator DEM, respectively. In this manner, the signal received by each one of the receiving antennas EA1, EA2 and EA3 can be individually demodulated to obtain and evaluate the data being carried by the modulated signal as received by each of the receiving antennas. The A/D converter AD1 and the demodulator DEM are also each respectively coupled with a signal processor SP, which in turn is further coupled with a memory unit MEM. In some embodiments, elements similar to A/D converter AD1, demodulator DEM, signal processor SP and memory unit MEM may be included in transceiver SE1.

In some embodiments, signal processor SP includes hardware for executing instructions, such as those making up a computer program. As an example and not by way of limitation, to execute instructions, signal processor SP may retrieve (or fetch) the instructions from an internal register, an internal cache, memory unit MEM, or storage; decode and execute them; and then write one or more results to an internal register, an internal cache, memory unit MEM, or storage. In particular embodiments, signal processor SP may include one or more internal caches for data, instructions, or addresses. This disclosure contemplates signal processor SP including any suitable number of any suitable internal caches, where appropriate.

This disclosure contemplates one or more computer-readable storage media implementing any suitable storage. In particular embodiments, a computer-readable storage medium implements one or more portions of signal processor SP (such as, for example, one or more internal registers or caches), one or more portions of memory unit MEM, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, byte code, one or more computer programs, one or more executable, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language, machine code, or hardware description language.

Figure 5:
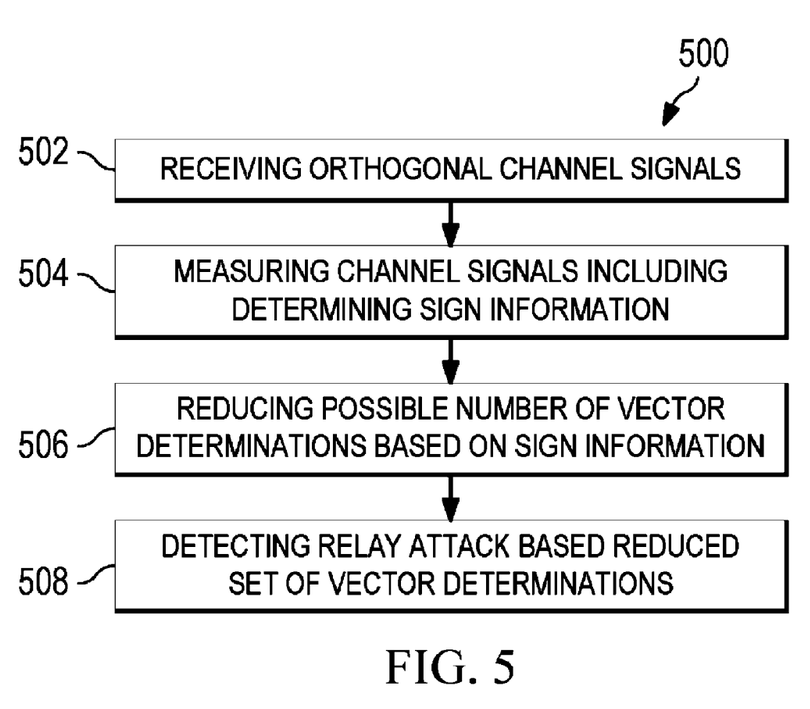
FIG. 5 is a flow diagram of a process of sign detection in multi-dimensional signal measurements.

FIG. 5 is a flow diagram of a process 500 of sign detection in multi-dimensional signal measurements. Process 500 can be implemented by, for example, one or more components of system 400, described in reference to FIG. 4. In some implementations, part or all of process 500 can be implemented as instructions stored on a non-transitory computer-readable storage medium and executed by one or more processors or processing cores, such as SP, described in reference to system 400.

In some implementations, process 500 can begin by receiving orthogonal channel signals (502). For example, the signals can be analog signals received from 3 orthogonally oriented antennas that are converted (e.g., AD1) to digital signals that can be processed by digital processor (e.g., SP).

Process 500 can continue by measuring the channel signals including determining sign information (504). For example, the channel signals can be inputs to comparator functions to determine if the channels are in phase (same sign or polarity) or out of phase (different sign or polarity), where each channel represents a vector component of a received magnetic field. The comparing function can be implemented in hardware (FIG. 3) or software by a signal processor (FIG. 4) or a combination of both hardware and software components.

Process 500 can continue by reducing the possible number of vector interpretations based on the sign information (506). For example, if the x and y channels have the same signs (same polarity) and the x and z channel signals have different signs (different polarity), than the vector interpretations that have different signs for the x and y channels or the same sign for the x and z channels are excluded from further processing for angle or angle difference evaluations or vector component ratios.

Process 500 can continue by detecting a relay attack based on the reduced set of vector determinations (508). For example, the reduced vector interpretations determined in step 506 can be used to generate a set of angles or angle differences or vector component ratios between the reduced set of vectors, which can be compared (together with the RSSI value) with a predetermined or expected set of angles or angle differences or vector component ratios to determine if the expected criteria to detect a relay attack situation are met. If these criteria are met (within a certain tolerance range), the key or key fob will not transmit an authentication code to the vehicle, thereby preventing relay attacks.

Although in example step 508 the reduced possible number of magnetic vector interpretations is used to detect relay attacks against, for example, a PEPS system, process 500 can also be applied to any application that could benefit from reducing a possible number of vector interpretations in a vector space and thus should not be construed to be limited to magnetic field vectors or detecting relay attacks.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A system comprising:
   an interface operable to obtain signals from antennas, where the signals correspond to components of vectors in space;

one or more signal processors coupled to the interface and configured to:
  determine polarities of the signals based on phase measurements between the signals;
  reduce a possible number of vector interpretations based on the determined polarities of the signals;
  reduce a possible number of angles or angle differences between the vectors based on the reduced possible number of vector interpretations; and
  compare the reduced possible number of angles or angle differences to predetermined angle or angle differences.

2. The system of claim 1, where comparing the polarities of the signals includes comparing the signals with threshold values.

3. The system of claim 2, where the threshold values are a percentage of maximum values of the signals.

4. The system of claim 1, where the interface comprises:
  one or more signal amplifiers configured to amplify the signals;
  one or more analog-to-digital converters (ADCs) coupled to the signal amplifiers and configured to convert the amplified signals to digital values; and
  the one or more signal processors coupled to the one or more ADCs and configured for determining the polarities of the signals based on the digital values.

5. The system of claim 3, further comprising:
  one or more signal amplifiers configured to amplify the signals;
  comparators having inputs coupled to outputs of the signal amplifiers and the threshold voltages, the comparators configured for indicating when the signals exceed the threshold values; and
  logic configured to compare comparator outputs to determine the polarities of the signals.

6. The system of claim 1, where one or more ratios between the components of one or more vectors are determined based on the reduced possible number of vector interpretations; and the one or more actions related to the system are performed based on comparison of the ratios with expected ratios.

7. The system of claim 6, where the ratios are determined for same vector component for two different vectors.

8. The system of claim 6, where the ratios are determined for different vector components for two different vectors.

9. The system of claim 1, where the circuit is included in a key or key fob of a passive entry, passive start (PEPS) system of a vehicle.

10. The system of claim 1, where the possible number of vector interpretations is reduced from eight to two.

11. A method comprising:
  obtaining, by an interface of a system, signals from antennas coupled to the interface, where the signals correspond to components of vectors in space;
  determining, by one or more signal processors of the system, polarities of the signals based on phase measurements between the signals;
  reducing, by the one or more signal processors, a possible number of vector interpretations based on the determined polarities of the signals;
  reducing, by the one or more signal processors, a possible number of angles or angle differences between the vectors based on the reduced possible number of vector interpretations; and
  comparing, by the one or more signal processors, the reduced possible number of angles or angle differences to predetermined angles or angle differences.

12. The method of claim 11, where comparing the polarities of the signals includes comparing the signals with threshold values.

13. The method of claim 12, where the threshold values are a percentage of maximum values of the signals.

14. The method of claim 11, further comprising:
  amplifying the signals by one or more signal amplifiers coupled to the interface;
  converting the amplified signals to digital values by one or more analog-to-digital converters (ADCs) coupled to the signal amplifiers; and
  determining, by the one or more signal processors coupled to the one or more ADCs, the polarities of the signals based on the digital values.

15. The method of claim 12, further comprising:
  amplifying the signals by one or more signal amplifiers coupled to the interface;
  comparing the signals with threshold voltages, by comparators having inputs coupled to outputs of the signal amplifiers and the threshold voltages, to indicate when the signals exceed the threshold values; and
  comparing, by logic, comparator outputs to determine polarities of the signals.

16. The method of claim 11, further comprising:
  determining one or more ratios between the components of one or more vectors based on the reduced possible number of vector interpretations; and
  performing one or more actions related to the system based on comparison of the ratios with expected ratios.

17. The method of claim 16, where the ratios are determined for same vector component for two different vectors.

18. The method of claim 16, where the ratios are determined for different vector components for two different vectors.

19. A non-transitory, computer-readable storage medium having instructions stored thereon, which, when executed by one or more processors, causes the one or more processors to perform operations comprising:
  obtaining antenna signals that correspond to components of vectors in space;
  determining polarities of the signals based on phase measurements between the signals;
  reducing a possible number of vector interpretations based on the determined polarities of the signals;
  reducing a possible number of angles or angle differences between the vectors based on the reduced possible number of vector interpretations; and
  comparing the reduced possible number of angles or angle differences to predetermined angles or angle differences.

20. The non-transitory, computer-readable storage medium of claim 19, where comparing the signs or polarities of the signals includes comparing the signals with threshold values.

* * * * *